(12) United States Patent
Kulkarni et al.

(10) Patent No.: US 9,644,311 B2
(45) Date of Patent: May 9, 2017

(54) RECHARGING OF NFC SYSTEM AND ALGORITHMS TO CONSERVE POWER SUPPLY OF NFC SYSTEM DESIGNED FOR CLOTHES DRYER

(71) Applicant: General Electric Company, Schenectady, NY (US)

(72) Inventors: Ashutosh Kulkarni, Louisville, KY (US); Jaeseok Noh, Seoul (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 295 days.

(21) Appl. No.: 14/596,473

(22) Filed: Jan. 14, 2015

(65) Prior Publication Data

US 2016/0201253 A1    Jul. 14, 2016

(51) Int. Cl.
| | |
|---|---|
| *D06F 58/28* | (2006.01) |
| *H02J 7/02* | (2016.01) |
| *H04B 5/00* | (2006.01) |
| *H02J 5/00* | (2016.01) |

(52) U.S. Cl.
CPC ............ *D06F 58/28* (2013.01); *H02J 5/005* (2013.01); *H02J 7/025* (2013.01); *H04B 5/0037* (2013.01); *D06F 2058/2858* (2013.01); *H04B 5/0031* (2013.01)

(58) Field of Classification Search
CPC ...................................................... H02J 5/005
USPC ........................................................ 307/104
See application file for complete search history.

(56) References Cited

FOREIGN PATENT DOCUMENTS

| | | |
|---|---|---|
| EP | 1 148 169 A2 | 10/2001 |
| JP | 56-60340 A | 5/1981 |
| WO | WO 2013/18402 A1 | 12/2013 |

OTHER PUBLICATIONS

English translation of Bibliographic Data/Abstract of JPS5660340A listed above.

*Primary Examiner* — Robert Deberadinis
(74) *Attorney, Agent, or Firm* — Dority & Manning, P.A.

(57) ABSTRACT

Methods and systems are provided for operating a wireless communications device powered by a rechargeable battery and for providing charging of the rechargeable battery. More particularly methods are provided for recharging a battery used to provide operating power to a communications device, particularly a near field communications (NFC) device in a clothes dryer. The method and system determine whether the drum of the clothes dryer is rotating and if not rotating is in a proper alignment to enable charging of the battery. Battery charging may take place when the a battery charger, located at a stationary position in the dryer, is aligned or rotated to be aligned, with the communications device. The battery charger may correspond to a reader of the communications device, an inductive charger separate from the reader, or a slip ring arrangement.

17 Claims, 9 Drawing Sheets

RECHARGING OF NFC SYSTEM AND ALGORITHMS TO CONSERVE POWER SUPPLY OF NFC SYSTEM DESIGNED FOR CLOTHES DRYER

FIELD OF THE INVENTION

The present disclosure relates generally to clothes drying appliances. More particularly, the present disclosure is directed to clothes dryer wireless moisture data transfer systems, battery recharging methods and systems, and energy-efficient methods of operation thereof.

BACKGROUND OF THE INVENTION

In order to provide enhanced control of a clothes drying appliance, it can be desirable to know the moisture content of clothing being dried by a clothes dryer. For example, the dryer can be operated until it is sensed that the moisture content of the clothing has fallen below a desired amount. The heater or other appropriate components of the clothes dryer can then be de-energized or otherwise controlled accordingly.

Certain existing clothes dryers use two metal rods in parallel or a combination of rods and the drum surface as a sensor to detect available moisture in the clothing. Other sensors for detecting temperature and relative humidity can be added as well to sense internal air properties.

These sensors typically receive excitation power from the dryer control board via a physical connection such as electrical wires. Therefore, the sensors are placed on a non-rotating components of the dryer, such as the door or a fixed back wall.

However, for many of such sensors, physical contact between the sensor and the clothes being dried is required for accurate sensor readings. Therefore, sensors positioned on the non-rotating components of the dryer, such as the door or a fixed back wall can have less frequency of contact with the entire clothing and do not provide consistently accurate readings.

Placement of the sensors on the rotating components of the dryer, such as the drum or associated lifters or baffles, can result in obtaining more accurate readings at a higher frequency. However, placement of the sensors on the rotating components can present additional problems. For example, wireless communication systems may be required for transmitting the data from rotating components to the non-rotating components.

In addition, one or more local power sources, such as batteries, may be required to power the sensors and the rotating components, including the rotating data transfer components. As such components generally must be powered over the lifespan of a clothes drying appliance, energy efficiency is a key requirement for extending battery life over the entire lifespan. It would be convenient, however, if there were systems and methods available that permitted the use of rechargeable batteries in dryer environments so that less stringent power conservation methods may be required and a more uniform power output from the batteries might be provided.

Therefore, clothes dryer wireless moisture data transfer systems and energy-efficient methods of operation thereof are needed.

BRIEF DESCRIPTION OF THE INVENTION

Aspects and advantages of the invention will be set forth in part in the following description, or may be obvious from the description, or may be learned through practice of the invention.

In general, the present subject matter is directed to methods and systems designed to conserve a battery power supply in an NFC circuit and that provide recharging of the battery after the charge has dropped to a predetermined level. The present subject matter also generally relates to algorithms useful to transfer data to a control system The present subject matter relates to a method of operating a near field communication (NFC) tag where the NFC tag is secured to a rotatable drum of a clothes drying appliance for communications with a stationary NFC reader within the clothes drying appliance and the NFC tag is powered by a rechargeable battery. According to such method a determination is made as to whether the drum is currently rotating and whether the NFC tag is aligned with the NFC reader. The method then provides for operating a charging circuit to charge the rechargeable battery when it is determined that the drum is not currently rotating and the NFC tag is in alignment with the NFC reader and further to provide for operating a charging circuit to charge the rechargeable battery by first rotating the drum until the NFC tag is aligned with the NFC reader when it is determined that the drum is not aligned with the NFC reader.

The present subject matter further relates to a clothes dryer having a cabinet, a drum defining a space for the receipt of clothes for drying rotatably mounted within the cabinet, and one or more sensors positioned within the drum, wherein the one or more sensors respectively output one or more output signals indicative of an amount of moisture contained within the clothes. In such appliance a near field communication (NFC) tag is positioned on an exterior surface of the drum and wired to receive the output signals from the plurality of sensors and a rechargeable battery power supply is electrically connected to the NFC tag. The appliance is further provided with a battery charging circuit and an NFC reader positioned exterior to the drum and in operative communication with a controller of the clothes dryer, such that the operation of the clothes dryer can be controlled based on the amount of moisture contained within the clothes. In such appliance the NFC tag uses near field communication to provide sensor and battery voltage level data to the NFC reader which is stationary and positioned adjacent to a rotational path of the NFC tag and the battery charging circuit charges the rechargeable battery based at least in part on whether the drum is rotating.

Further still, the present subject matter relates to a method for operating a rechargeable battery powered wireless communication tag of a moisture sensing system of a clothes drying appliance. According to such method a determination is made as to whether a drum of the clothes drying appliance is rotating and a further determination is made as to whether the communications tag is aligned with a battery charger. According to such method, when it is determined that the drum is not currently rotating, and the wireless communication tag is in alignment with the battery charger, the method provides for operating the battery charger to recharge the rechargeable battery. On the other hand when it is determined that the drum is not aligned with the battery charger, the method provides for rotating the drum until the wireless communication tag is aligned with the battery charger and operating the battery charger to recharge the rechargeable battery.

These and other features, aspects and advantages of the present invention will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to wireless data transfer systems for use in a clothes dryer, to methods and systems designed to conserve a battery power supply in an NFC circuit and that provide recharging of the battery after the battery charge has dropped to a predetermined level. The preset subject matter also generally relates to algorithms useful to transfer data to a control system, and to energy-efficient methods of operating the same.

With reference now to the FIGS., example embodiments of the present subject matter will be discussed in further detail.

Figure 1:
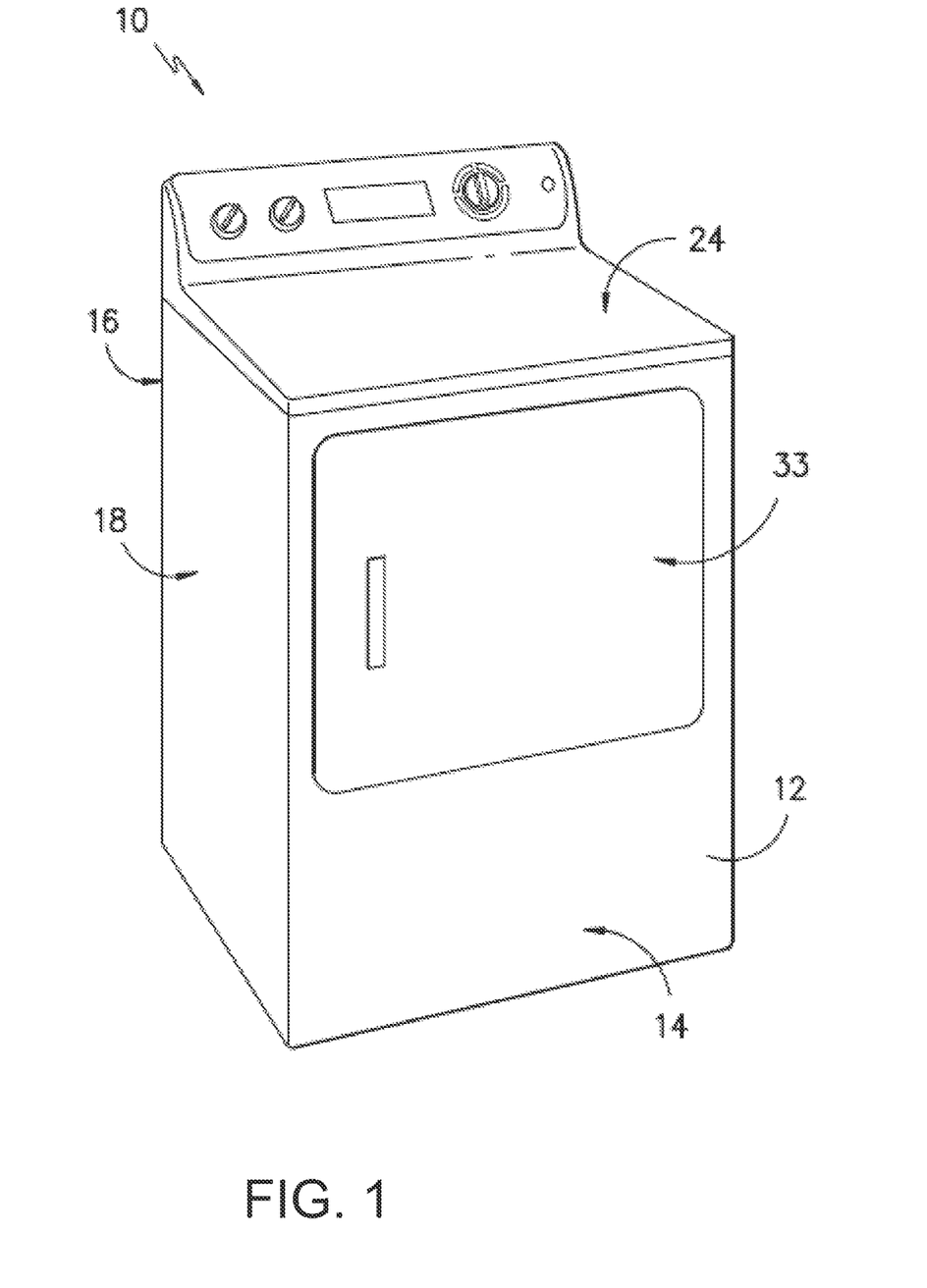
FIG. 1 provides a perspective view of a dryer appliance according to an example embodiment of the present subject matter.
Figure 2:
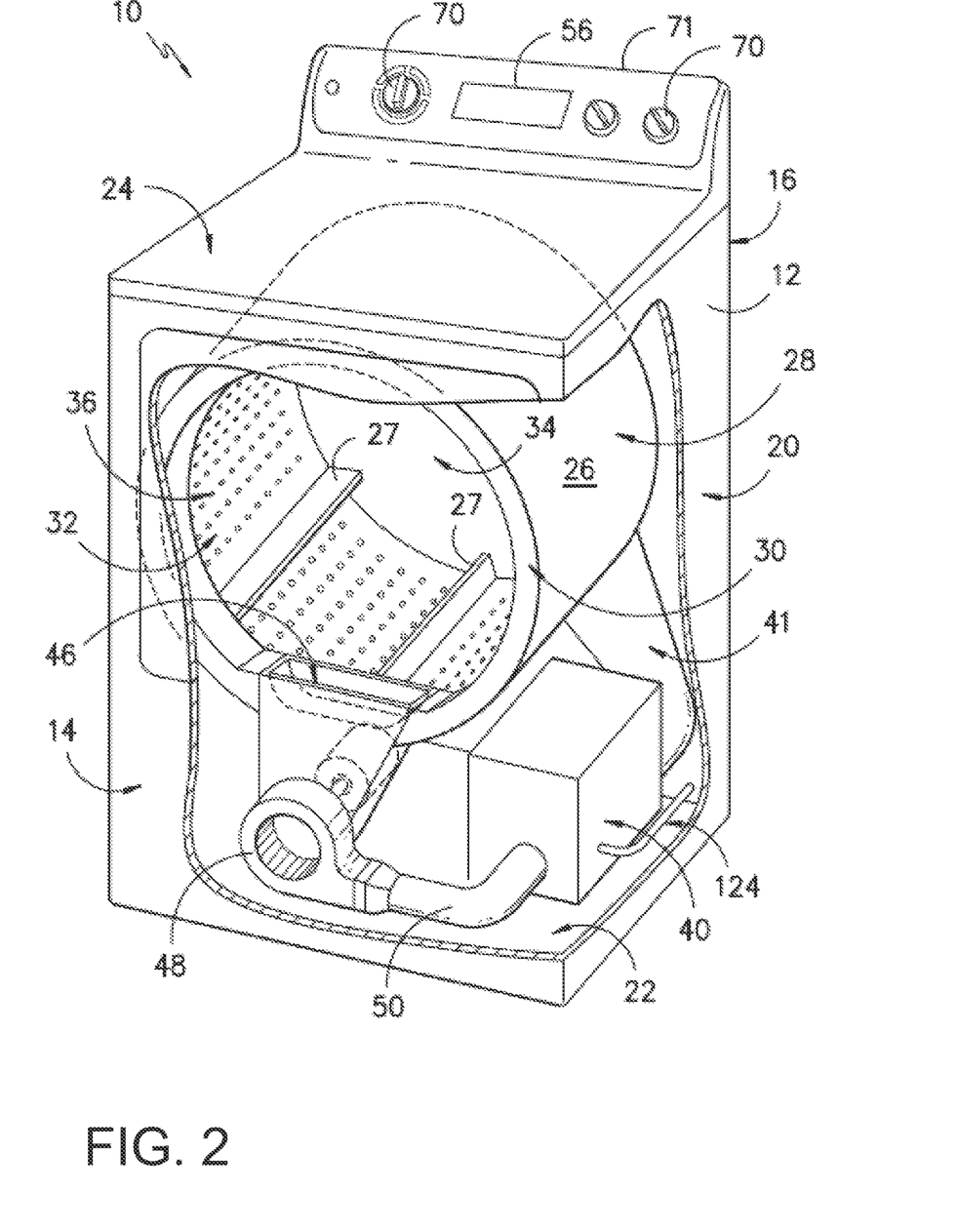
FIG. 2 provides another perspective view of the dryer appliance of FIG. 1 with a portion of a cabinet of the dryer appliance removed in order to show certain components of the dryer appliance.

FIG. 1 illustrates an example dryer appliance 10 according to an example embodiment of the present subject matter. FIG. 2 provides another perspective view of dryer appliance 10 with a portion of a cabinet or housing 12 of dryer appliance 10 removed in order to show certain components of dryer appliance 10. While described in the context of a specific embodiment of dryer appliance 10, using the teachings disclosed herein it will be understood that dryer appliance 10 is provided by way of example only. Other dryer appliances having different appearances and different features may also be utilized with the present subject matter as well.

Cabinet 12 includes a front panel 14, a rear panel 16, a pair of side panels 18 and 20 spaced apart from each other by front and rear panels 14 and 16, a bottom panel 22, and a top cover 24. Within cabinet 12 is a drum or container 26 mounted for rotation about a substantially horizontal axis. Drum 26 defines a chamber 25 for receipt of articles of clothing for drying. Drum 26 extends between a front portion 37 and a back portion 38.

As used herein, the term "clothing" includes but need not be limited to fabrics, textiles, garments, linens, papers, or other items from which the extraction of moisture is desirable. Furthermore, the term "load" or "laundry load" refers to the combination of clothing that may be washed together in a washing machine or dried together in a laundry dryer (e.g. clothes dryer) and may include a mixture of different or similar articles of clothing of different or similar types and kinds of fabrics, textiles, garments and linens within a particular laundering process.

A motor 31 is configured for rotating drum 26 about the horizontal axis, e.g., via a pulley and a belt (not shown). Drum 26 is generally cylindrical in shape, having an outer cylindrical wall 28 and a front flange or wall 30 that defines an opening 32 of drum 26, e.g., at front portion 37 of drum 26, for loading and unloading of articles into and out of chamber 25 of drum 26. A plurality of lifters or baffles (e.g. lifters 27 and 29) are provided within chamber 25 of drum 26 to lift articles therein and then allow such articles to tumble back to a bottom of drum 26 as drum 26 rotates.

In some embodiments, each lifter can have a lifting face and a non-lifting face. For example, in the instance in which the drum 26 rotates clockwise from the perspective of a viewer situated in front of the opening 32, lifter 27 will have a lifting face. Likewise, in the instance in which the drum 26 rotates clockwise from the perspective of a viewer situated in front of the opening 32, lifter 29 will have a non-lifting face. As will be discussed further below, in some embodiments of the present disclosure, one or more sensors may be positioned on the lifting face and/or non-lifting face of each lifter. Furthermore, lifters having shapes other than those shown in FIG. 2 may be used as well.

In some embodiments, the drum may reverse rotational directions during portions of various drying operations. In such embodiments, for example, the face of each lifter that performs lifting functionality for a majority of the operation time can be designated as the lifting face. As another example, the face of each lifter that performs lifting functionality during a critical period in which sensing of load moisture content is most relevant and scrutinized (e.g. the final period of drying) can be designated as the lifting face.

Drum 26 also includes a back or rear wall 34, e.g., at back portion 38 of drum 26. Rear wall 34 can be fixed or can be rotatable. A supply duct 41 is mounted to rear wall 34 and receives heated air that has been heated by a heating assembly or system 40.

Motor 31 is also in mechanical communication with an air handler 48 such that motor 31 rotates a fan 49, e.g., a centrifugal fan, of air handler 48. Air handler 48 is configured for drawing air through chamber 25 of drum 26, e.g., in order to dry articles located therein. In alternative example embodiments, dryer appliance 10 may include an additional motor (not shown) for rotating fan 49 of air handler 48 independently of drum 26.

Drum 26 is configured to receive heated air that has been heated by a heating assembly 40, e.g., in order to dry damp articles disposed within chamber 25 of drum 26. For example, heating assembly 40 can include a heating element (not shown), such as a gas burner or an electrical resistance heating element, for heating air. As discussed above, during operation of dryer appliance 10, motor 31 rotates drum 26 and fan 49 of air handler 48 such that air handler 48 draws air through chamber 25 of drum 26 when motor 31 rotates fan 49. In particular, ambient air enters heating assembly 40 via an inlet 51 due to air handler 48 urging such ambient air into inlet 51. Such ambient air is heated within heating assembly 40 and exits heating assembly 40 as heated air. Air handler 48 draws such heated air through supply duct 41 to drum 26. The heated air enters drum 26 through a plurality of outlets of supply duct 41 positioned at rear wall 34 of drum 26.

Within chamber 25, the heated air can accumulate moisture, e.g., from damp clothing disposed within chamber 25. In turn, air handler 48 draws moisture saturated air through a screen filter (not shown) which traps lint particles. Such moisture saturated air then enters an exit duct 46 and is passed through air handler 48 to an exhaust duct 52. From exhaust duct 52, such moisture saturated air passes out of dryer appliance 10 through a vent 53 defined by cabinet 12. After the clothing articles have been dried, they are removed from the drum 26 via opening 32. A door 33 provides for closing or accessing drum 26 through opening 32.

A cycle selector knob 70 is mounted on a cabinet backsplash 71 and is in communication with a processing device or controller 56. Signals generated in controller 56 operate motor 31 and heating assembly 40 in response to the position of selector knobs 70. Alternatively, a touch screen type interface may be provided. As used herein, "processing device" or "controller" may refer to one or more microprocessors, microcontroller, ASICS, or semiconductor devices and is not restricted necessarily to a single element. The controller can be programmed to operate drying machine 10 by executing instructions stored in memory. The controller may include, or be associated with, one or more memory elements such as for example, RAM, ROM, or electrically erasable, programmable read only memory (EEPROM).

Figure 3:
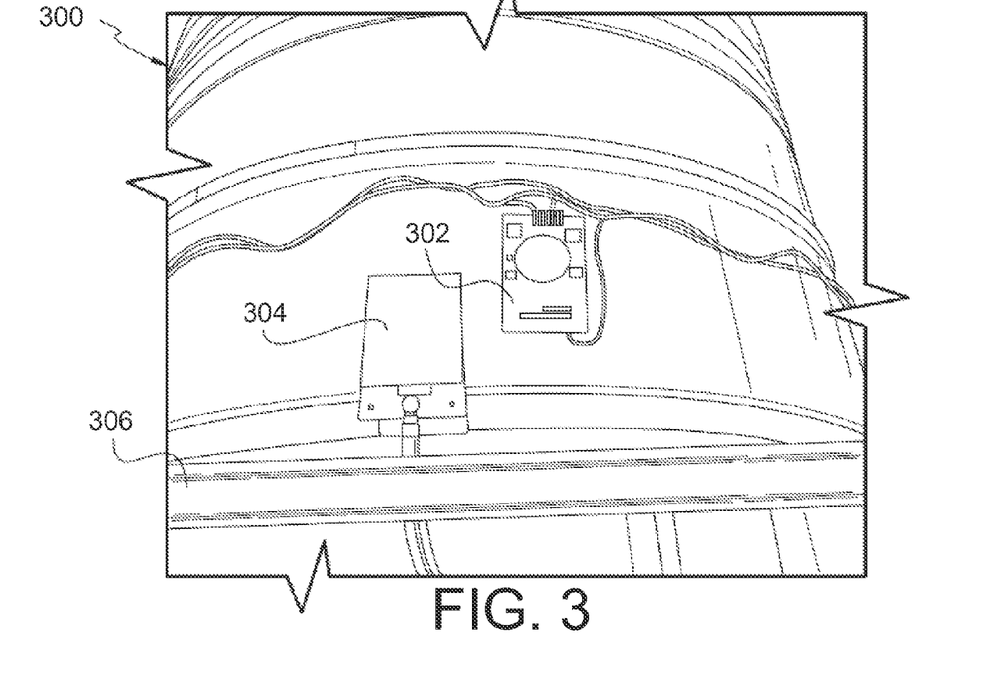
FIG. 3 depicts an exterior of a drum of an example clothes dryer according to an example embodiment of the present disclosure.

FIG. 3 depicts an exterior 300 of a drum of an example clothes dryer according to an example embodiment of the present disclosure. Also shown in FIG. 3 is a near field communication (NFC) tag 302 mounted to an exterior surface of the drum. Sensor wiring and battery are shown connected to the tag 302. An NFC reader 304 is mounted to a stationary member 306 of the dryer apron. According to an aspect of the present disclosure, the NFC tag 302 can receive moisture data from one or more sensors positioned within the interior of the drum. The moisture data can be wirelessly communicated from the tag 302 to the reader 304. The reader 304 can then provide the moisture data to a main controller of the clothes dryer, such that the operation of the clothes dryer can be controlled based on an amount of moisture contained within clothes present in the drum. The operation of the NFC tag 302 and NFC reader 304 will be discussed further with reference to FIGS. 5 and 6.

Figure 4:
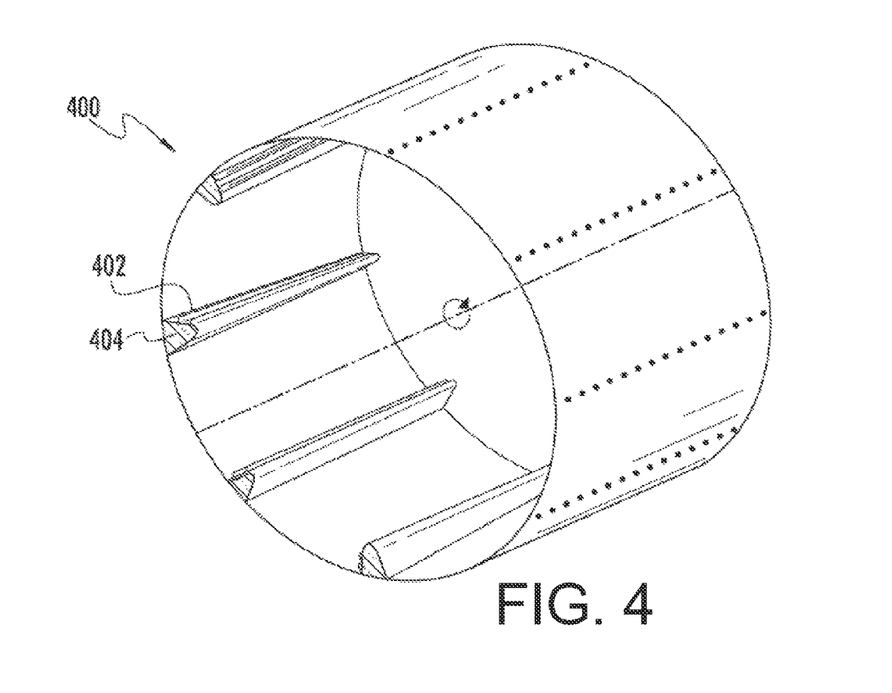
FIG. 4 depicts an example moisture sensor placement according to an example embodiment of the present disclosure.

FIG. 4 provides a simplified depiction 400 of a first example sensor placement according to an example embodiment of the present disclosure. In particular, the first example sensor placement includes one of a plurality of sensors placed on the lifting face of each of a plurality of lifters included in a drum of a clothes dryer. As an example, sensor 402 (e.g. a pair of conductive rods) is positioned on a lifting face of lifter 404.

Other sensor placements be used as well. As an example, in other embodiments, the plurality of sensors are placed on the non-lifting faces of the plurality of lifters instead of the lifting faces. As another example, the plurality of sensors can be placed on both the lifting faces and the non-lifting faces. As yet another example, the plurality of sensors can be placed within each of a plurality of basins formed between respective adjacent pairs of lifters. As another example, the plurality of sensors can be circumferentially oriented sensors positioned along an interior surface of the drum at respective longitudinal axis positions. As yet another example, a conductive (e.g. metallic) coating or cladding covering two different portions of the surface of each lifter can serve as the plurality of sensors.

Figure 5:
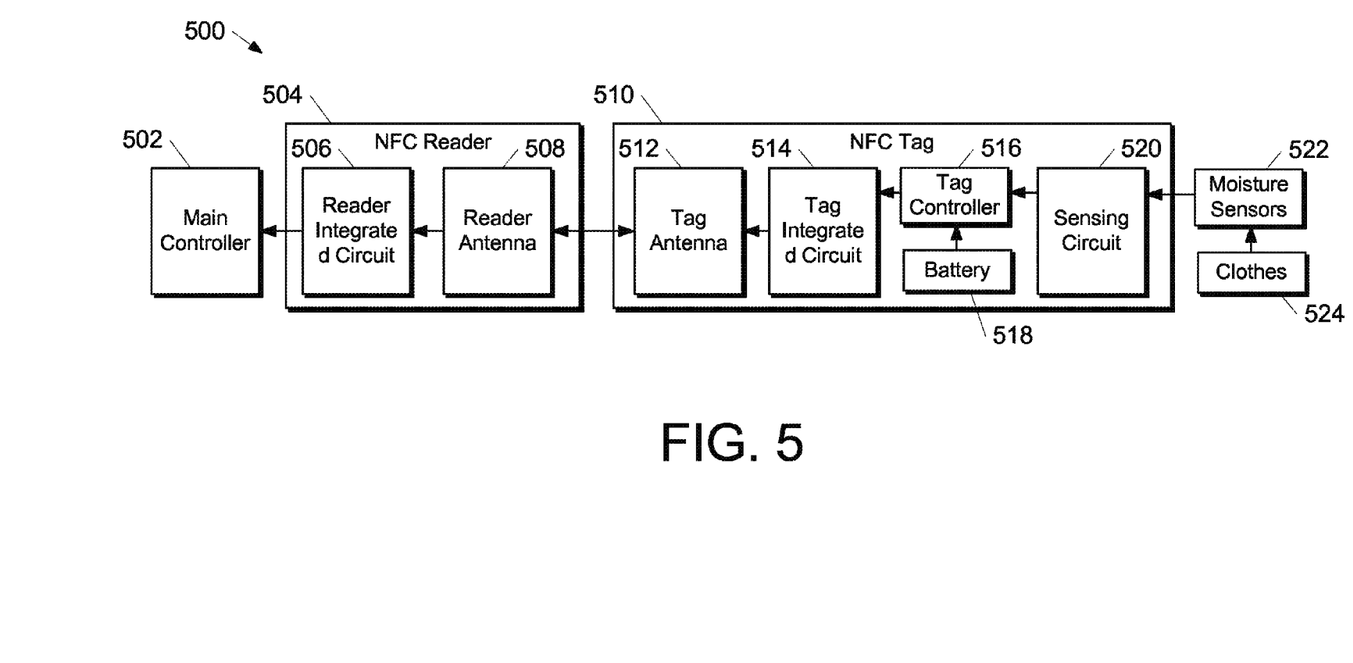
FIG. 5 depicts a block-diagram of an example clothes dryer wireless moisture data transfer system according to an example embodiment of the present disclosure.

FIG. 5 depicts a block-diagram of an example clothes dryer wireless moisture data transfer system 500 according to an example embodiment of the present disclosure. In particular, FIG. 5 depicts one example configuration for the flow of data in system 500. System 500 can include a main controller 502, an NFC reader 504, an NFC tag 510, and one or more sensors 522.

The sensors 522 can be any suitable sensors for sensing one or more parameters of clothing inside a drum of the clothes dryer. For example, the sensors can be moisture sensors (as shown), dryness sensors, relative humidity sensors, clothing temperature sensors, air temperature sensors, or other suitable sensors.

As an example, each sensor 522 can be a conductivity sensor such as two conductive (e.g. metallic) rods in parallel, two conductive strips in parallel, or two different metal coatings on a lifter surface. Each conductivity sensor can be used to measure moisture content of the clothing or other parameters such as clothing surface temperature. In particular, in some embodiments, each sensor (e.g. each pair of conductive rods) can provide an output signal (e.g. voltage signal or current signal) corresponding to conductivity or resistance of clothes under drying indicating stage of drying versus time. The resistance/voltage decreases compared to a reference voltage when clothing with moisture simultaneously contacts any or all of the sensor pairs.

Furthermore, the amount by which the voltage decreases when clothing with moisture simultaneously contacts the two conductive portions can be proportional to the amount of moisture contained within the clothing. Therefore, in some embodiments, one of the conductive portions of the sensor may be held at a predetermined voltage (e.g. five volts). The voltage at such conductive portion will experience a decrease when clothing with moisture contacts both conductive portions. Such decrease will be proportional to the amount of moisture and will be reflected in the output signal.

In some embodiments, all of the sensors 522 can be wired together to provide a single, combined output signal. Thus, the combined output signal will reflect clothing parameters for the entirety of the drum. The combined output signal can be provided to the NFC tag 510. In further embodiments, sensors 522 may be organized into two or more groupings (e.g. based on sensor type or sensor position) that respectively provide two or more combined output signals to the NFC tag 510.

The NFC tag 510 can include circuitry or other components for receiving the output signal from the sensors 522, converting the output signal from analog to digital, and then storing the data in a local memory (e.g. an EEPROM). In particular, NFC tag 510 can include a sensing circuit 520, a tag controller 516, a battery 518, a tag integrated circuit (IC) 514, and a tag antenna 512.

NFC tag 510 can be mounted on an exterior surface of the clothes dryer drum. Battery 518 can provide excitation energy to both sensors 522 and some or all of the other components of NFC tag 510. In accordance with the present subject matter, battery 518 is provided as a rechargeable battery for providing energy. Rechargeable battery 518 can be physically included within the NFC tag 510 or can be mounted separately on the drum surface or inside the lifters.

NFC reader 504 can include components and associated circuitry for obtaining data stored at NFC tag 510 and then providing the obtained data to the main controller 502. In particular, NFC reader 504 can include a reader antenna 508 and a reader integrated circuit (IC) 506.

NFC reader 504 can be secured to the cabinet of the clothes dryer so that it is stationary. NFC reader 504 can be positioned adjacent to a rotational path of the NFC tag 510. Therefore, in some embodiments, data transfer between NFC tag 510 and NFC reader 504 can occur once per drum rotation when the tag 510 is located adjacent to the reader 504.

As an example implementation of the system 500, the sensing/control process can begin with the moisture sensors 522 measuring moisture values of clothes 524 present in the drum of the clothes dryer. For example, the sensors 522 can output an analog signal describing a voltage between conductive portions of the sensors.

Next, the NFC tag 510 can receive the analog moisture data from the moisture sensors 522 via the sensing circuit 520. The tag controller 516 can convert the analog moisture data into digital moisture data and can store the digital data in a memory included in the tag IC 514 (e.g. an EEPROM included within the tag IC 514).

When the drum is positioned such that the NFC tag 510 and NFC reader 504 are located adjacent to one another, the NFC reader 504 can obtain the digital data from the NFC tag 510 using near field communication. The NFC reader 504 can provide the obtained moisture data to the main controller 502. It should be appreciated that the ability of NFC reader 504 to obtain data from NFC tag 510 when the reader and tag are located adjacent one another can be used to indicate drum position, which indication can be used to indicate proper alignment of the two devices to allow charging of rechargeable battery 518 in accordance with the present subject matter.

Main controller 502 can control the clothes drying appliance based on the data received from the NFC reader 504. As an example, main controller 502 can determine a moving average of the moisture data, compare the moving average to a threshold value, and when the moving average of the data exceeds the threshold value, de-energize a heater of the clothes drying appliance 500.

Thus, the clothes dryer can be stopped upon sensing that the moisture level is satisfactory, thereby preventing over-drying or under-drying conditions. By avoiding over-drying, wear and tear on the clothing can be reduced, energy consumption can be improved, and service calls due to overheating of clothing can be avoided.

Furthermore, although system 500 is shown as using near field communication to wirelessly transfer moisture data, in some embodiments of the present disclosure, other wireless communications protocols or methods can be used in addition or alternatively to NFC. For example, any other wireless communication technologies such as Bluetooth, Wi-Fi, ZigBee, RFID, infrared, optical, or other wireless communication methods can be applied for the wireless transmission of moisture data between the tag and the reader.

Figure 6:
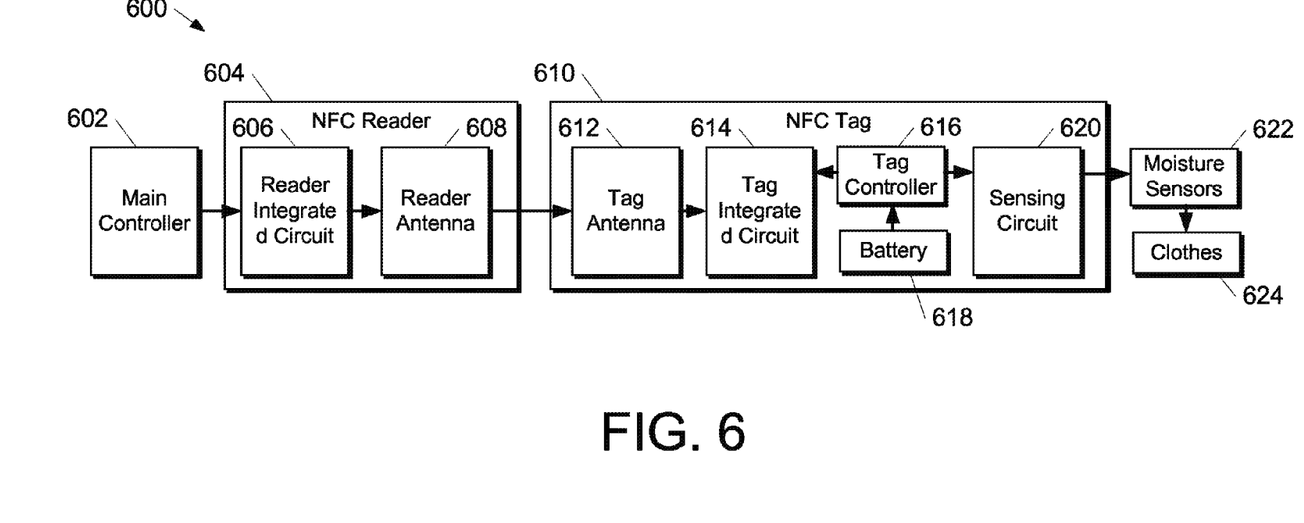
FIG. 6 depicts a block-diagram of an example clothes dryer wireless moisture data transfer system according to an example embodiment of the present disclosure.

FIG. 6 depicts a block-diagram of an example clothes dryer wireless moisture data transfer system 600 according to an example embodiment of the present disclosure. In particular, FIG. 6 depicts one example configuration for the flow of power in system 600. System 600 can include a main controller 602, an NFC reader 604, an NFC tag 610, and one or more sensors 622.

According to an aspect of the present disclosure, the NFC tag 610 can receive power from both a local rechargeable battery 618 and wirelessly from the NFC reader 604 via inductive power transfer. In particular, power transferred from a reader antenna 608 of the NFC reader 604 to a tag antenna 612 of the NFC tag 610 can be used to power a memory (e.g. an EEPROM) included in a tag IC 614 of the NFC tag 610 as well as, in some embodiments, to charge battery 618. Thus, wireless power transferred across the NFC antennas can be used for each instance in which the NFC reader 604 obtains data stored at the NFC tag 610.

In an example implementation of the system 600, the main controller 602 can supply power to the NFC reader 604 whenever the drum of the clothes dryer is rotating. When the NFC reader 604 is located adjacent to the NFC tag 610, a voltage can be induced across the tag antenna 612 by the reader antenna 608, thereby providing the wireless transfer of power and charging of battery 618.

The voltage induced at the tag antenna 612 can be used to power the tag IC 614, which includes a memory (e.g. EEPROM) storing moisture data. Thus, power wirelessly transferred from the NFC reader 604 to the NFC tag 610 can be used to read or otherwise obtain moisture data stored at the tag 610.

However, the duration for which the antennas 608 and 612 are located closely enough to perform power transfer is generally too small to generate stable power via wireless power transfer at typical drum speeds. In accordance with the present subject matter, however, additional opportunities to transfer power to charge battery 618 may be provided by stopping rotation of the drum while tag antenna 612 is proximate NFC tag 610.

Therefore, battery 618 of the NFC tag 610 can be used to supply stable power for the operation of the tag controller 616, sensing circuit 620, and moisture sensors 622. The power from battery 618 can also be used to power the tag IC 614 when the tag controller 616 is writing newly received moisture data to the memory in tag IC 614.

However, as noted above, for battery 618 to provide sufficient power for the entire lifespan of the clothes drying appliance, the battery-powered components should be operated in an energy-efficient manner and the battery should be monitored to determine appropriate recharging periods so as to maintain proper output voltage levels to power the various tag components.

Figure 7:
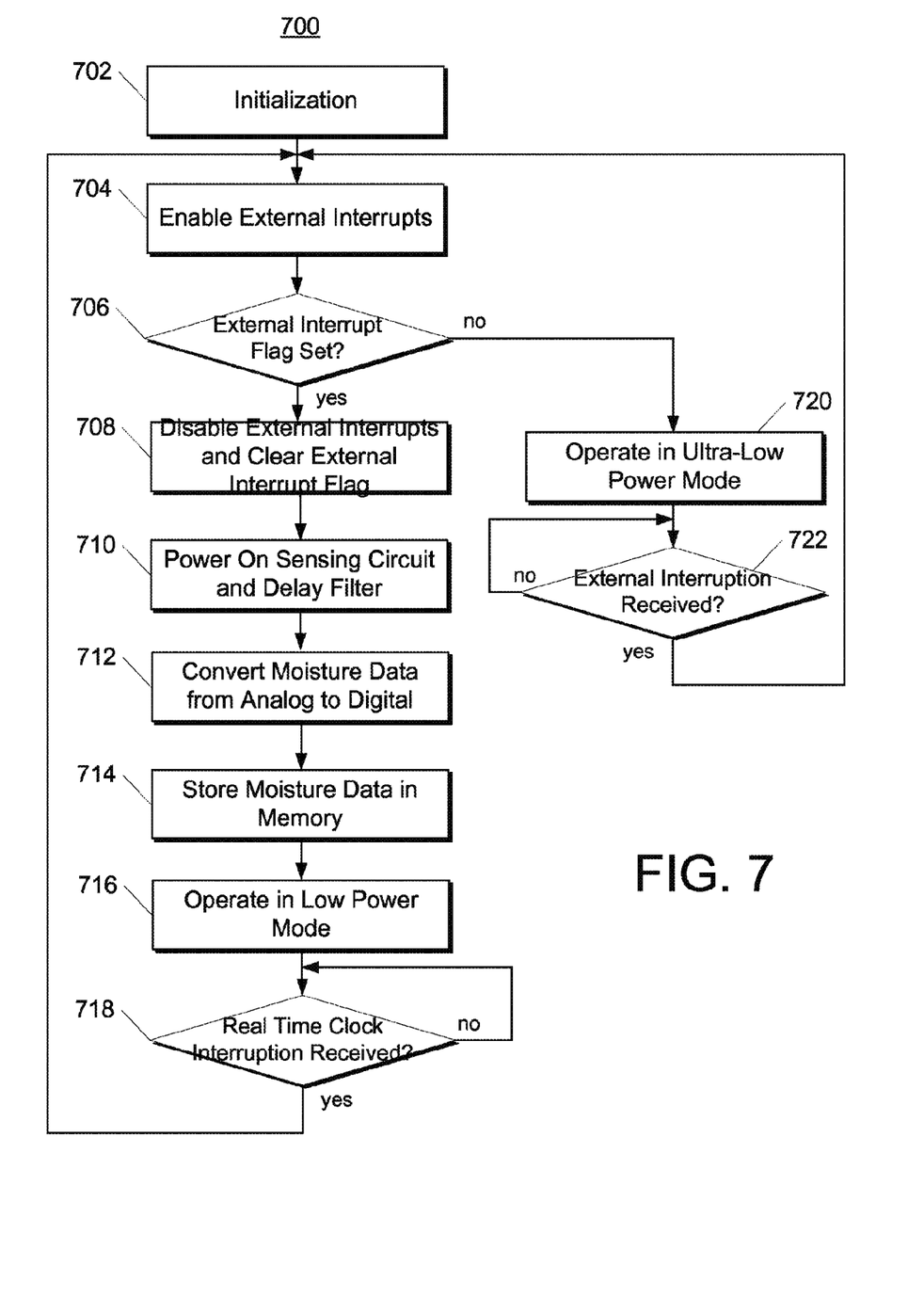
FIG. 7 depicts a flow chart of an example method for operating a near field communication tag of an example clothes dryer wireless moisture data transfer system according to an example embodiment of the present disclosure.

As an example, FIG. 7 depicts a flow chart of an example method 700 for operating a near field communication tag of an example clothes dryer wireless moisture data transfer system according to an example embodiment of the present disclosure. Although FIG. 7 depicts steps performed in a particular order for purposes of illustration and discussion, methods of the present disclosure are not limited to such particular order or arrangement. Various steps of the method 700 can be omitted, rearranged, combined, and/or adapted in various ways without deviating from the scope of the present disclosure.

At 702 the system can be initialized. For example, it can be initialized when it is first powered by a switch on and battery on the NFC tag. The NFC tag can implement method 700 to determine its appropriate operation.

At 704 external interrupts can be enabled. For example, as discussed above, when the drum of the clothes drying appliance rotates, the NFC tag can periodically be located adjacent to an excited NFC reader antenna (e.g. once per rotation). At that time, and induced voltage can be generated in the antenna of the NFC tag. This induced voltage can be used as an external interrupts source. Thus, for example, at 704 the NFC tag controller can enable an input that receives external interrupts based on induced voltages at the NFC tag antenna.

At 706 it can be determined whether an external interrupt flag has been set. More particularly, when the NFC reader induces a voltage across the antenna of the NFC tag, and external interrupt can be provided to the NFC tag controller. When the NFC tag controller receives the external interrupt, a value of an external interrupt flag can be modified. For example, the external interrupt flag can be set to one when an external interrupt is received. Thus, by determining whether the external interrupt flag has been set at 706, the NFC tag can determine whether the drum is currently rotating. In particular, if the drum is rotating then the NFC reader will periodically induce voltages across the NFC tag antenna, thereby causing the external interrupt flag to be set.

It is determined at 706 that the external interrupt flag has not been set, then method 700 can proceed to 720. At 720 NFC tag can be operated in an ultra-low power mode. Thus, if the drum of the clothes drying appliance is not rotating, the NFC tag it can be operated in the ultra-low power mode. During ultra-low power mode, some or all power consuming components of the NFC tag can be disabled so that they do not consume power. For example, when in ultra-low power mode, the NFC tag controller and all peripheral clocks can be stopped.

However, if it is determined at 706 that the external interrupt flag has been set, then method 700 can proceed to 708. At 708 external interrupts can be disabled and the external interrupt flag can be cleared (e.g. set to zero).

At 710 a sensing circuit and delay filter can be powered on. For example, the sensing circuit and delay filter can be powered on so as to receive moisture data from one or more sensors. As an example, the NFC tag controller operate a general purpose input/output (GPIO) to supply power to the moisture sensing circuit for a limited period of time in which the NFC tag collects moisture data.

At 712 moisture data can be converted from analog to digital. For example, the NFC tag controller can convert the moisture data received by the sensing circuit from an analog signal into digital data.

At 714 the moisture data can be stored in memory. For example, the NFC tag controller can store the digital data in a memory included within an integrated circuit of the NFC tag. For example, the memory can be electrically erasable programmable read-only memory (EEPROM). As an example, the NFC tag controller can operate the GPIO to supply power to the EEPROM of the tag IC for a limited period of time in which the digital moisture data is stored.

At 716 the NFC tag can be operated in low-power mode. Thus, in some embodiments, steps 708 through 714 can be viewed as a normal mode. At the conclusion of the normal mode, the NFC tag can be placed into the low power mode. As such, during rotation of the drum, the NFC tag can periodically transition between normal mode and low power mode. In low power mode, some or all components of the NFC tag can be disabled from consuming power, except for a real time clock of the NFC tag. Thus, for example, low power mode can be similar to ultra-low power mode, except that the real time clock is powered in low power mode.

At 718 it can be determined whether a real time clock interruption has been received. More particularly, the real time clock can be configured to provide a real time clock interruption periodically according to a predefined time period. As an example, the real time clock may be configured to provide a real time clock interruption every 30 seconds.

If it is determined at 718 that a real time clock interruption has not been received, then method 700 can loop again to 718. In such fashion, the NFC tag can be operated in the low power mode until a real time clock interruption is received. Therefore, the periodic transition of the NFC tag between the normal mode and the low power mode during drum rotation can be controlled or otherwise defined by the duration for the real time clock interruption.

However, if it is determined at 718 that a real time clock interruption has been received, then method 700 can return to 704. At 704 external interrupts can again be enabled and at 706 it can be determined whether the external interrupt flag is set. If the external interrupt flag is set, then method 700 can proceed to 708 and the NFC tag can begin operate in normal mode.

However, if it is determined at 706 that the external interrupt flag is not set, then method 700 can proceed to 720 and operate in ultra-low power mode. Thus upon receipt of the real time clock interruption while in low power mode, the NFC tag can again determine whether the drum is still rotating. If the drum is still rotating, the NFC tag can re-enter normal mode. However, if the drum has stopped rotating the NFC tag can be placed in ultra-low power mode.

At 722 it can be determined whether an external interruption has been received. For example, an external interruption can be received when a voltage is induced across the NFC tag antenna by the NFC reader.

If it is determined at 722 that an external interruption has not been received, then method 700 can group again to 722. In such fashion, the NFC tag can be operated in the ultra-low power mode until an external interruption is received. In other words, the NFC tag can be operated in the ultra-low power mode until the drum resumes rotation. If it is determined at 722 that an external interruption has been received, then method 700 can return to 704.

Thus, the NFC tag can transition between the normal mode, the low-power mode, and the ultra-low power mode based at least in part on whether the drum is rotated. In particular, the NFC tag can be operated in ultra-low power mode when the drum is not rotating. However, when the drum is rotating, the NFC tag can periodically transition between low-power mode and normal mode. Generally, NFC tag components such as the sensing circuit and integrated circuit memory are powered only for a limited period of time during normal mode. Thus, for the majority of the time that the NFC tag is operated, the NFC tag will be operating in either ultra-low power mode or low power mode, thereby greatly reducing the total time for which the NFC tag is consuming power over the lifespan of the clothes drying appliance.

In addition, although method 700 uses an external interrupt flag that is modified based on external interrupts in the form of induced antenna voltages to determine whether the drum is rotating, the present disclosure is not limited to such methods. For example, other methods for determining whether the drum is rotating can be used, including, for example, motion sensors, accelerometers, Hall effect sensors, or other sensors.

Figure 8:
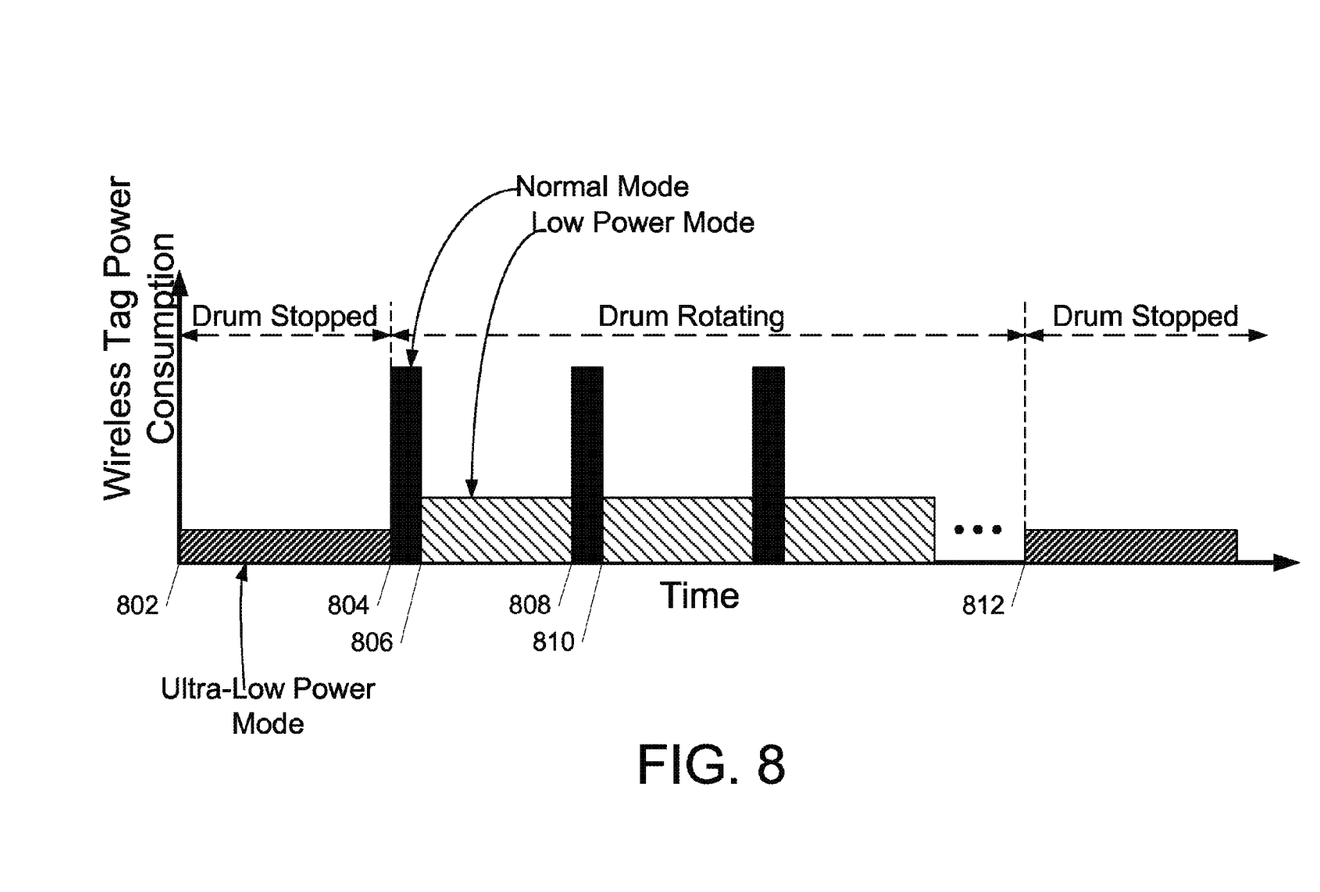
FIG. 8 depicts a graph of near field communication tag power consumption versus time according to an example embodiment of the present disclosure.

As an example, FIG. 8 depicts a graph 800 of near field communication tag power consumption versus time according to an example embodiment of the present disclosure.

In particular, at time 802 the drum is stopped or otherwise not rotating. Therefore, the NFC tag is operated in ultra-low power mode. In accordance with the present subject matter, during this period of time and other periods when the drum is stopped, the drum may be positioned so that the drum stops when the NFC tag and the Reader Antenna are aligned and able to transmit data as previously described to provide an opportunity to charge the rechargeable battery. In alternative embodiments a separate position sensor may be used to aid in aligning the NFC tag with either the Reader Antenna or a separate charging device. Battery charging may then we conducted wirelessly using the Reader Antenna as a charging coil or a separate inductive coupling arrangement, or still further in alternative embodiments via a slip ring mechanism. This charging operation may be conducted before, during or after dryer operation.

At time 804 the drum begins rotating. Therefore, the NFC reader will induce a voltage across the NFC tag, thereby providing an external interrupt that will wake the tag from ultra-low power mode and place the tag into normal mode.

At time 806 the NFC tag has completed the operations performed during normal mode. After normal mode, the NFC tag will transition to low power mode.

At time 808 the NFC tag will transition from low power mode back into normal mode. In particular, a real time clock of the NFC tag can have provided a real time clock interruption at time 808. Upon receiving the real time clock interruption, the NFC tag can determine whether the drum is still rotating (e.g. by checking an external interrupt flag that is set due to external interruptions). Because the drum is still rotating at time 808, the NFC tag will again transition back into normal mode.

At time 810 the NFC tag has completed the operations performed during normal mode. After normal mode, the NFC tag will again transition into low power mode. This cycle periodically recurs until the drum stops rotating.

In particular, at time 812 the drum has stopped rotating. Therefore, the NFC tag will transition into ultra-low power mode.

Figure 9:
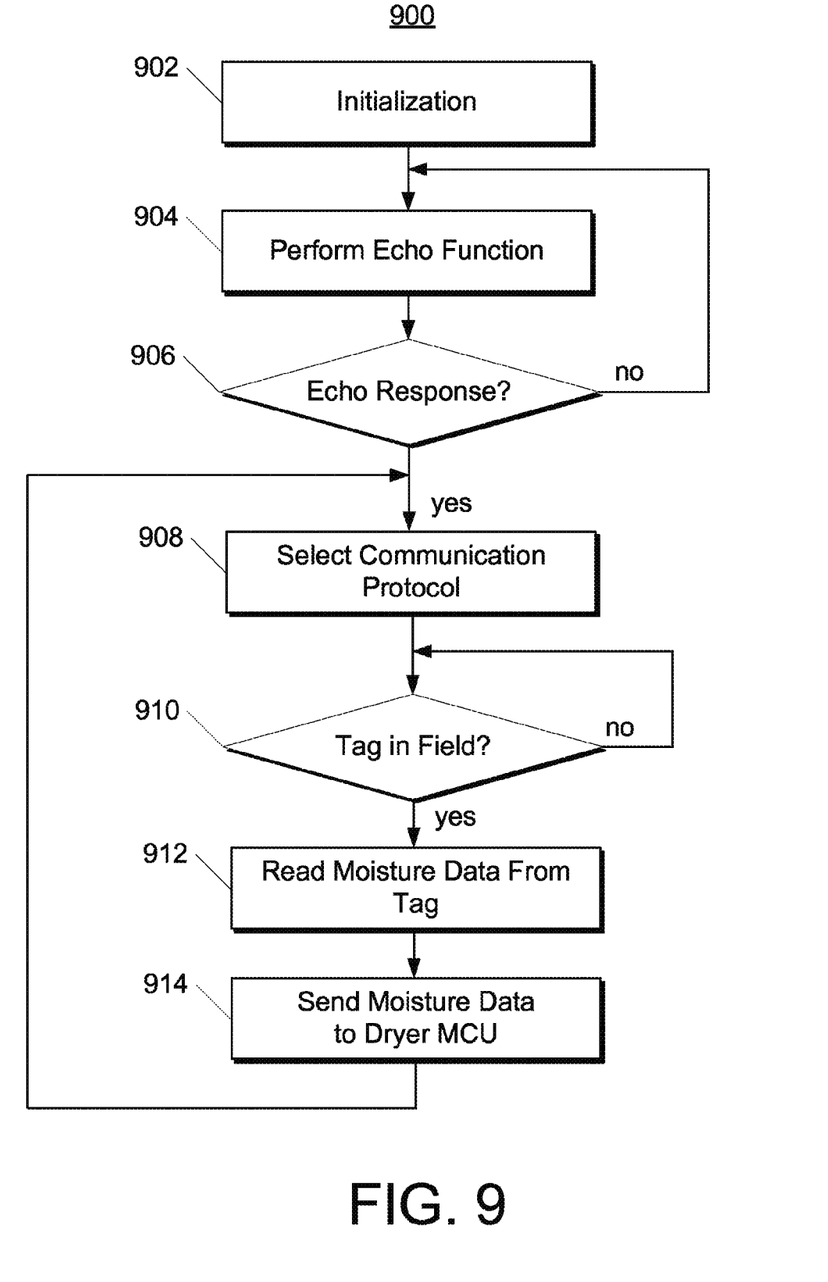
FIG. 9 depicts a flow chart of an example method for operating a near field communication reader of an example clothes dryer wireless moisture data transfer system according to an example embodiment of the present disclosure.

FIG. 9 depicts a flow chart of an example method for operating a near field communication reader of an example clothes dryer wireless moisture data transfer system according to an example embodiment of the present disclosure. Although FIG. 9 depicts steps performed in a particular order for purposes of illustration and discussion, methods of the present disclosure are not limited to such particular order or arrangement. Various steps of the method 900 can be omitted, rearranged, combined, and/or adapted in various ways without deviating from the scope of the present disclosure.

At 902 the NFC reader can be initialized. For example, the main controller of the appliance can supply power to the NFC reader when the drum of the appliance begins to rotate. Alternatively, the NFC reader system can be initialized when the appliance is powered, regardless of whether the drum is rotating.

At 904 an echo function can be performed. By performing the echo function, the reader can check whether communications can be started between the main controller of the clothes drying appliance and the reader integrated circuit.

At 906 it can be determined whether an echo response was received. For example, the echo response can confirm that communications between the main controller and the reader can be started.

If it is determined at 906 that an echo response was not received, then method 900 can return to 904 and again perform the echo function. In such fashion, the reader can perform the echo function until it is given an indication by the main controller of the appliance that communications started.

However, if it is determined at 906 that an echo response was received, the method 900 can proceed to 908.

At 908 a communication protocol can be selected. As an example, at 908 the near field verification protocol can be set to ISO 15693. In particular, for example, the reader antenna can be configured to operate at 13.56 MHz.

At 910 it can be determined whether the NFC tag is within a communication field. In particular, it can be determined whether the NFC tag is located sufficiently close to the reader for near field communication to be performed.

If it is determined at 910 that the NFC tag is not in the field, then method 900 can loop back to 910 and again check to see if the tag is in the field.

However, if it is determined at 910 that the NFC tag is in the communications field, then method 900 can proceed to 912.

At 912 moisture data can be read from the tag. In particular, the reader antenna can induce a voltage across the antenna of the NFC tag. The induced voltage can be used to power a memory (e.g. EEPROM) included in an integrated circuit of the NFC tag. The NFC reader can then obtain the stored moisture data from the powered memory using near field communication.

At 914 moisture data can be sent from the reader to the main controller of the clothes dryer appliance. For example, the NFC reader can provide the moisture data to main controller by SPI, UART, I2C, SCI, or other wired communication methods.

After 914, method 900 can return to 908. In such fashion, the reader can obtain moisture data wirelessly from the NFC tag and supply such data to a main controller of the clothes dryer appliance.

Figure 10:
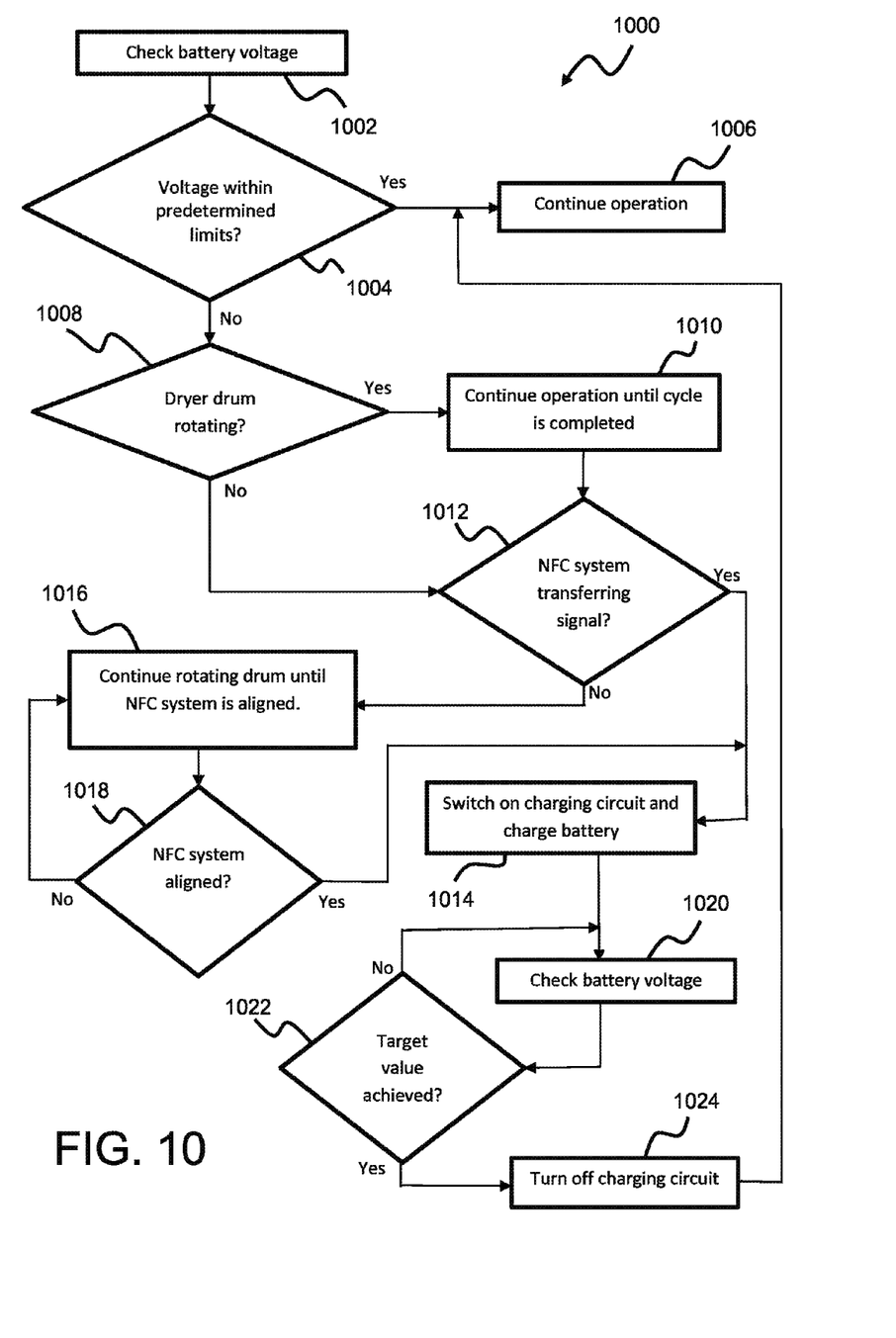
FIG. 10 depicts a flow chart of an example method for charging a rechargeable battery power supply for a near field communication tag of an example clothes dryer wireless moisture data transfer system according to an example embodiment of the present disclosure.

FIG. 10 depicts a flow chart 1000 of an example method for charging a rechargeable battery power supply for a near field communication reader of an example clothes dryer wireless moisture data transfer system according to an example embodiment of the present disclosure. Although FIG. 10 depicts steps performed in a particular order for purposes of illustration and discussion, methods of the present disclosure are not limited to such particular order or arrangement. Various steps of the method 1000 can be omitted, rearranged, combined, and/or adapted in various ways without deviating from the scope of the present disclosure.

The method illustrated in flow chart 1000 may be considered to be a subroutine of the normal dryer operating software and may be called periodically within, prior to, and/or after the normal operation of the dryer operating software. Regardless of the time the subroutine is called, at step 1002 the battery voltage is checked. This battery voltage check may be conducted during normal operation of the dryer and at the same time as data is being transmitted from the NFC tag to the Reader Antenna. At step 1004 a determination is made as to whether the battery voltage is within predetermined limits. If the battery voltage is acceptable, that is, within the predetermined limits, the subroutine proceeds to step 1006 where the subroutine exits and returns the dryer to its ongoing operation.

On the other hand if at step 1004 it is determined that the battery voltage is not within the predetermined limits the subroutine then determines at step 1008 whether the dryer drum is rotating. If the drum is rotating, the subroutine proceeds to step 1010 where the dryer will continue its normal operational cycle to completion and then the subroutine would proceed to step 1012 to determine whether the NFC system is transferring a signal. This determination, if true, would indicate alignment of the Reader Antenna and NFC tag. In alternate embodiments step 1012 may determine whether the NFC tag is in alignment with an alternate charging device based on a signal from a position sensor. As previously noted, alternate charging devices may include an inductive charging device or a slip ring arrangement. If at step 1008 it is determined that the dryer drum is not rotating, the subroutine goes directly to step 1012 which then makes a determination as described above.

If step 1012 determines that the NFC system is transferring a signal, or, alternatively in other embodiments, if the NFC tag is aligned with an alternate charging device, the subroutine proceeds to step 1014 where the charging circuit is activated and the rechargeable battery is charged. If, on the other hand, the subroutine determines at step 1012 that the NFC tag is not in proper alignment either with the reader antenna so that signals may be transmitted or in alternate embodiments in proper alignment with an inductive charging device or slip ring device the subroutine proceeds to step 1016 where instructions are given to the drum control system to continue rotation of the drum until proper alignment is achieved. This portion of the subroutine will loop through steps 1016 and 1018 until a determination is made that system alignment has been achieved.

When step 1018 determines that system alignment has been achieved, the subroutine proceeds to step 1014 where a battery charging circuit is turned on and the battery is charged. The subroutine then proceeds to step 1020 where a check of battery voltage is made and then to step 1022 where a determination is made as to whether a target value for the battery charge has been reached. If the determination at step 1022 is that the target value has not been reach, the subroutine loops between steps 1020 and 1022 until the target value for the battery charge is achieved. Once the target value has been achieve, the subroutine proceeds to step 1024 where the charging circuit is turned off and then proceeds to step 1006 where the subroutine exits and hands control back to the dryer operating software.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a near field communication (NFC) tag, the NFC tag being secured to a rotatable drum of a clothes drying appliance for communications with a stationary NFC reader within the clothes drying appliance, the NFC tag being powered by a rechargeable battery, the method comprising:
   determining whether the drum is currently rotating;
   determining whether the NFC tag is aligned with the NFC reader;
   when it is determined that the drum is not currently rotating, and the NFC tag is in alignment with the NFC reader, operating a charging circuit to charge the rechargeable battery; and
   when it is determined that the drum is not aligned with the NFC reader rotating the drum until the NFC tag is aligned with the NFC reader and operating a charging circuit to charge the rechargeable battery.

2. The method of claim 1, wherein determining whether the drum is currently rotating comprises determining whether a voltage has been induced across a first antenna of the NFC tag by a second antenna of the NFC reader.

3. The method of claim 2, wherein determining whether a voltage has been induced comprises reading an external interrupt flag, wherein a value of the external interrupt flag is modified when the voltage is induced across the first antenna of the NFC tag by the second antenna of the NFC reader.

4. The method of claim 1, further comprising determining whether the battery voltage is within predetermined limits.

5. The method of claim 4, further comprising operating the charging circuit until the battery voltage is within the predetermined limits.

6. The method of claim 1, wherein operating a charging circuit comprises operating an inductive power transfer charging circuit.

7. A clothes dryer, comprising:
   a cabinet;
   a drum rotatably mounted within said cabinet, said drum defining a space for the receipt of clothes for drying;
   one or more sensors positioned within the drum, wherein said one or more sensors respectively output one or more output signals indicative of an amount of moisture contained within the clothes;
   a near field communication (NFC) tag positioned on an exterior surface of said drum and wired to receive the output signals from the plurality of sensors;
   a rechargeable battery power supply electrically connected to said NFC tag;
   a battery charging circuit; and
   an NFC reader positioned exterior to the drum and in operative communication with a controller of the clothes dryer, such that the operation of the clothes dryer can be controlled based on the amount of moisture contained within the clothes;
   wherein said NFC tag uses near field communication to provide sensor and battery voltage level data to said NFC reader;
   wherein said NFC reader is stationary and positioned adjacent to a rotational path of said NFC tag; and
   wherein said battery charging circuit charges said rechargeable battery based at least in part on whether the drum is rotating.

8. The clothes dryer of claim 7, wherein said battery charging circuit is associated with said NFC reader and is configured to charge said rechargeable battery when said NFC tag and said NFC reader are aligned.

9. The clothes dryer of claim 7, wherein detection of a voltage being induced across a first antenna of said NFC tag by a second antenna of said NFC reader determines whether the drum is rotating.

10. The clothes dryer of claim 7, wherein said battery charging circuit inductively couples charging energy to said rechargeable battery.

11. The close dryer of claim 7, wherein said battery charging circuit is configured to charge said rechargeable battery until the battery voltage is within predetermined limits.

12. A method for operating a rechargeable battery powered wireless communication tag of a moisture sensing system of a clothes drying appliance, the method comprising:
  determining whether a drum of the clothes drying appliance is rotating;
  determining whether the communications tag is aligned with a battery charger;
  when it is determined that the drum is not currently rotating, and the wireless communication tag is in alignment with the battery charger, operating the battery charger to recharge the rechargeable battery; and
  when it is determined that the drum is not aligned with the battery charger, rotating the drum until the wireless communication tag is aligned with the battery charger and operating the battery charger to recharge the rechargeable battery.

13. The method of claim 12, wherein determining whether the drum of the clothes drying appliance is rotating comprises determining whether a voltage has been induced across a first antenna of the wireless communication tag by a second antenna of a wireless communication reader, wherein the wireless communication reader is stationary and positioned adjacent to a rotational path of the wireless communication tag.

14. The method of claim 12, wherein determining whether the voltage has been induced across the first antenna of the wireless communication tag by the second antenna of the wireless communication reader comprises reading the external interrupt flag, wherein a value of the external interrupt flag is modified when the voltage is induced across the first antenna of the wireless communication tag by the second antenna of the wireless communication reader.

15. The method of claim 12, wherein determining whether the communications tag is aligned with a battery charger comprises determining whether the communications tag is aligned with a communications reader.

16. The method of claim 12, wherein operating the battery charger comprises operating an inductive power transfer charging circuit.

17. The method of claim 12, further comprising determining whether the battery voltage is within predetermined limits.

* * * * *